United States Patent
Loh et al.

(10) Patent No.: US 9,104,824 B1
(45) Date of Patent: Aug. 11, 2015

(54) POWER AWARE RETENTION FLOP LIST ANALYSIS AND MODIFICATION

(71) Applicant: Jasper Design Automation, Inc., Mountain View, CA (US)

(72) Inventors: Lawrence Loh, Milpitas, CA (US); Barbara Jobstmann, Saint-Sulpice (CH); Antonio Celso Caldeira, Jr., Mountain View, CA (US); Jamil R. Mazzawi, Nazareth (IL)

(73) Assignee: Jasper Design Automation, Inc., Mountain View, CA (US)

( * ) Notice: Subject to any disclaimer, the term of this patent is extended or adjusted under 35 U.S.C. 154(b) by 0 days.

(21) Appl. No.: 13/874,398

(22) Filed: Apr. 30, 2013

(51) Int. Cl.
*G06F 17/50* (2006.01)

(52) U.S. Cl.
CPC ........ *G06F 17/5031* (2013.01); *G06F 17/5081* (2013.01); *G06F 17/5045* (2013.01); *G06F 2217/78* (2013.01)

(58) Field of Classification Search
CPC ............ G06F 2217/78; G06F 17/5045; G06F 17/5081
USPC ......... 716/100–101, 106, 108–109, 110–111, 716/132–134
See application file for complete search history.

(56) References Cited

U.S. PATENT DOCUMENTS

| | | | |
|---|---|---|---|
| 5,696,694 A | 12/1997 | Khouja et al. | |
| 7,251,795 B2 | 7/2007 | Biswas et al. | |
| 7,302,672 B2 | 11/2007 | Pack et al. | |
| 7,523,424 B2 | 4/2009 | Kolpekwar et al. | |
| 7,596,769 B2 * | 9/2009 | Chen ............................. | 716/109 |
| 7,610,571 B2 * | 10/2009 | Chen ............................. | 716/109 |
| 7,735,030 B1 * | 6/2010 | Kalil et al. .................... | 716/136 |
| 7,739,629 B2 * | 6/2010 | Wang et al. ................... | 716/136 |
| 7,770,142 B1 | 8/2010 | Shmayovitsh et al. | |
| 7,779,381 B2 | 8/2010 | Chickermane et al. | |
| 7,797,659 B2 | 9/2010 | Chelput et al. | |
| 7,954,078 B1 * | 5/2011 | Wang et al. ................... | 716/127 |
| 7,958,475 B2 | 6/2011 | Khan | |
| 7,979,262 B1 | 7/2011 | Iyengar et al. | |
| 7,992,125 B2 * | 8/2011 | Chen ............................. | 716/136 |
| 8,195,439 B1 | 6/2012 | Hussain | |
| 8,201,137 B1 | 6/2012 | Bhushan et al. | |

(Continued)

OTHER PUBLICATIONS

Michael Keating et al., "Low Power Methodology Manual for System-on-Chip Design," 2007, Springer, pp. 27-28.

(Continued)

*Primary Examiner* — Stacy Whitmore
(74) *Attorney, Agent, or Firm* — Vista IP Law Group, LLP

(57) ABSTRACT

A register transfer level (RTL) design is received which models a digital circuit in terms of the flow of digital signals. A power intent description is received which may include a description of power domains, identification of retention flops for each power domain, a list of isolation signals, and power switch definitions. A transformed RTL is produced accounting for functionality described in the power intent description. The transformed RTL includes flops designated as retention flops and non-retention flops. A retention flop module analyzes the flops to ensure that flops are properly designated as retention or non-retention flops. A verification module performs power aware sequential equivalence checking on various RTL and power intent descriptions to verify that RTL and power intent description outputs behave the same when accounting for power states.

22 Claims, 6 Drawing Sheets

(56) References Cited

U.S. PATENT DOCUMENTS

| | | | |
|---|---|---|---|
| 8,234,617 B2 | 7/2012 | Chetput et al. | |
| 8,255,191 B1 | 8/2012 | Kolpekwar et al. | |
| 8,296,699 B1 | 10/2012 | Chetput et al. | |
| 8,296,703 B1 * | 10/2012 | Chakravadhanula et al. | 716/112 |
| 8,381,163 B2 * | 2/2013 | Schreiber et al. | 716/133 |
| RE44,479 E * | 9/2013 | Wang et al. | 716/105 |
| 8,554,530 B1 | 10/2013 | O'Riordan et al. | |
| 8,601,426 B1 | 12/2013 | Du | |
| 8,732,630 B1 | 5/2014 | Kolpekwar et al. | |
| 8,732,636 B2 | 5/2014 | Ginetti et al. | |
| 2001/0018647 A1 | 8/2001 | Weber | |
| 2003/0033595 A1 | 2/2003 | Takagi et al. | |
| 2003/0188272 A1 | 10/2003 | Karger et al. | |
| 2005/0050495 A1 | 3/2005 | McGuffin et al. | |
| 2005/0177334 A1 | 8/2005 | Hirano et al. | |
| 2005/0204316 A1 | 9/2005 | Nebel et al. | |
| 2006/0058994 A1 | 3/2006 | Ravi et al. | |
| 2006/0074626 A1 | 4/2006 | Biswas et al. | |
| 2006/0080076 A1 | 4/2006 | Lahiri et al. | |
| 2006/0190892 A1 | 8/2006 | Haridass et al. | |
| 2007/0245277 A1 * | 10/2007 | Chen | 716/5 |
| 2007/0245278 A1 * | 10/2007 | Chen | 716/5 |
| 2007/0245285 A1 * | 10/2007 | Wang et al. | 716/10 |
| 2008/0127015 A1 | 5/2008 | Chandramouli et al. | |
| 2008/0184181 A1 | 7/2008 | Chetput et al. | |
| 2009/0039952 A1 * | 2/2009 | Wang et al. | 327/544 |
| 2009/0089725 A1 | 4/2009 | Khan | |
| 2010/0064271 A1 * | 3/2010 | Chen | 716/5 |
| 2010/0192115 A1 | 7/2010 | Yang et al. | |
| 2010/0253387 A1 * | 10/2010 | Wang et al. | 326/34 |
| 2011/0161899 A1 | 6/2011 | Ginetti et al. | |
| 2011/0161900 A1 | 6/2011 | Ginetti et al. | |
| 2012/0131526 A1 * | 5/2012 | Schreiber et al. | 716/110 |
| 2012/0286824 A1 * | 11/2012 | Myers et al. | 326/93 |
| 2012/0286858 A1 * | 11/2012 | Biggs et al. | 327/565 |

OTHER PUBLICATIONS

UPF Solutions Guide, Jun. 2008, Accellera, pp. 1-28.

"Si2 Common Power Format Specification, Version 1.1", Silicon Integration Initiative, Inc. (Si2TM), Sep. 19, 2008.

Usami et al., "Automated Low-Power Technique Exploiting Multiple Supply Voltages Applied to a Media Processor", IEEE Journal of Solid-State Circuits, vol. 33, No. 3, Mar. 1998.

"Architecting, designing, implementing, and verifying low-power digital integrated circuits," 2007, Cadence Design Systems, Inc., pp. 1-12.

Gila Kamhi et al., "Early Power-Aware Design & Validation: Myth or Reality," Jun. 4, 2007, DAC Design Automation Conference 2007, pp. 210-211.

Jim Sproch, "Update on Accellera Unified Power Format Standardization Initiative," 2006, EDA Interoperability Developer's Forum, pp. 1-17.

Synopsys News Release, "Exar Selects JupiterXT Power Network Synthesis to Achieve Optimized Power Layout," Oct. 11, 2006, Synopsys, one page.

Synopsys, "Power Compiler," 2007, three pages.

Yatin Trivedi et al., "Design and Verification of Low Power ICs," Jun. 2007, 44th Design Automation Conference, 137 pages.

Dennis Brophy, "IEEE P1801 The Unified Power Format for Low Power Designs," Mar. 2008, DATE Design, Automation, and Test in Europe 2008, 88 pages.

SCD Source, "Special Technology Report Low Power Design," Sep. 2008, SCD Source, pp. 1-17.

"IEEE Standard for Design and Verification of Low Power Integrated Circuits," Mar. 27, 2009, pp. 1-234.

Albert Chen, NPL, "Faraday: CPF-based low power design Methodology for platform basec SoCs", Sep. 23, 2009 (google).

Cadence, "Cadence® Mixed-Signal Circuit Design Environment User Guide", Product Version 5.0, Oct. 2003.

chhsu, "Mixed Signal IC Design Kit Training Manual", 2003.

Power forwar, "Faraday: CPF-Based Low Power Design Methodology for Platform-Based SoCs", Sep. 23, 2009.

John Decker, Power-Aware Verification Spans IC Design Cycle A plan to closure approach helps ensure silicon success, Jun. 12, 2009.

Simulink, "Simulation and Model based design, WritingS-Functions", Version 6, Sep. 2006.

Office Action dated Jan. 2, 2014 for U.S. Appl. No. 13/874,388.

Notice of Allowance dated May 27, 2014 for U.S. Appl. No. 13/874,388.

Notice of Allowance dated Oct. 3, 2014 for U.S. Appl. No. 13/874,388.

\* cited by examiner

POWER AWARE RETENTION FLOP LIST ANALYSIS AND MODIFICATION

BACKGROUND

The present disclosure relates generally to analysis of circuit designs, and more particularly to analyzing and ensuring proper functionality of lower power designs.

As the complexity in circuit design has increased, there has been a corresponding need for improvements in various kinds of analysis and debugging techniques. In fact, these analysis and debugging techniques have evolved from relatively simple transistor circuit-level simulation (in the early 1970s) to logic gate-level simulation (in the late 1980s) to the current art that uses Register Transfer Language (RTL)-level simulation, and formal verification. RTL describes the registers of a computer or digital electronic system and the way in which data are transferred among the combinational logic between registers.

Existing verification and debugging tools are used in the design flow of a circuit. The design flow begins with the creation of a circuit design at the RTL level using RTL source code. The RTL source code is specified according to a Hardware Description Language (HDL), such as Verilog HDL or VHDL. Circuit designers use high-level hardware description languages because of the size and complexity of modern integrated circuits. Circuit designs are developed in a high-level language using computer-implemented software applications, which enable a user to use text-editing and graphical tools to create a HDL-based design.

An important factor in many modern circuit design applications is reducing the amount of power consumed. Modern low-power circuit designs utilize power-domains to manage power to a group of logic in a circuit design. In order for this scheme to work, the interfaces between the different power-domains need to be modified to ensure error-free operation. Additionally, power domains that shut-off need to recover to a proper state when power is again provided.

Furthermore, sequential equivalence checking is typically performed on two circuits to determine that they are functionally equivalent at all times, i.e., given a set of input sequences, the output sequences match exactly. However, RTL descriptions of circuit designs do not contain power information causing failure of typical sequential equivalence checking since designs must be equivalent in all situations rather than only when power is provided in the power domains including outputs tested for equivalence. Thus, low power circuit designs cannot include some potentially power saving features while still passing verification testing to ensure proper functionality.

SUMMARY

Embodiments of the invention provide mechanisms for enhancing and verifying low power functionality through RTL transformation. A register transfer level (RTL) circuit model is received which models a digital circuit design in terms of the flow of digital signals. A power intent description is received which may include a description of power domains, identification of retention flops for each power domain, a list of isolation signals, and power switch definitions. A transformed RTL' is produced accounting for functionality described in the power intent description. The transformed RTL includes flops designated as retention flops and non-retention flops.

A retention flop module analyzes the flops to ensure that the set of retention flops specified in the power intent description is sufficient to properly retain the important states in the power domain. In one embodiment, x-propagation analysis is performed on a non-retention flop to verify that an unknown binary value at the non-retention flop does not propagate to another location following a power sequence. If an unknown binary value does propagate, the non-retention flop responsible is designated as a retention flop to eliminate the potential of errors being introduced by the propagated unknown binary value.

In another embodiment, it is determined whether flops designated as retention flops can be converted to non-retention flops without introducing any unknown binary values after a power sequence and a power delay n. The power delay n allows for a non-retention flop to have its value, which may be initially unknown, dictated by retention flop(s) with known value(s). A retention flop is removed from the retention flop list and the system determines whether an unknown binary value is introduced. If an unknown binary value is introduced, the retention flop is re-added to the retention flop list. If no unknown binary value is introduced, the flop may remain removed from the retention flop list and similar testing may be performed on additional flops that are currently designated as retention flops. The power delay n may be increased which likely increases the amount of retention flops that can be converted to non-retention flops without introducing any unknown binary values after a power sequence.

In another embodiment, a verification module performs power aware sequential equivalence checking on an RTL' generated from an RTL and UPF and an RTL'_opt generated from an RTL_opt and UPF_opt. In this case, RTL_opt and UPF_opt implement complexity reducing or power saving optimizations including those that may be designated by the retention flop module 150. Power aware sequential equivalence checking is performed on RTL' and RTL'_opt to verify that designated outputs are functionally equivalent when accounting for power settings described by the power intent descriptions and designated by a user.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1:
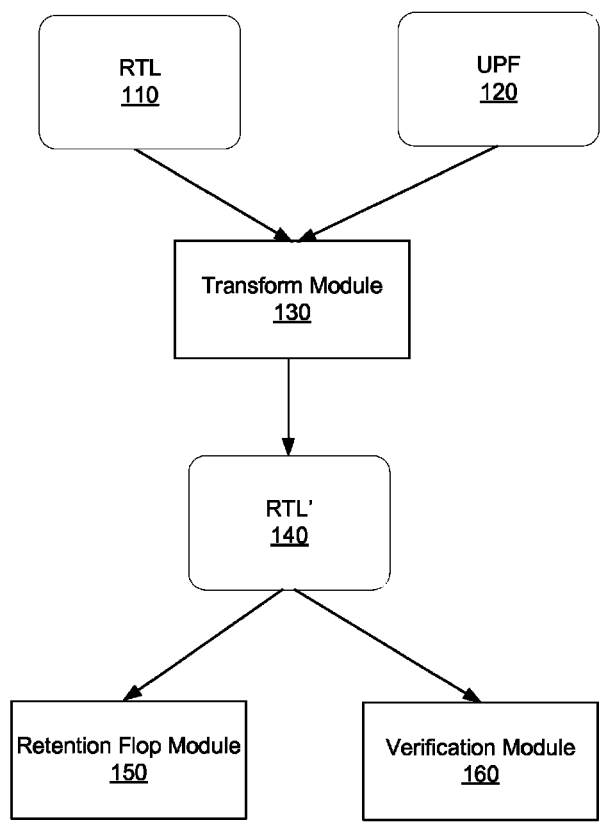
FIG. 1 illustrates a system 100 for transforming register transfer level (RTL) designs to take into account power intent descriptions and produce a power aware RTL'.

FIG. 1 illustrates a system 100 for transforming register transfer level (RTL) descriptions of circuit designs to take into account power intent descriptions and produce a power aware RTL' description of the circuit design. Examples of hardware description languages that utilize RTL descriptions include Verilog and VHDL. As used herein, a RTL description of a circuit design may also be referred to as a RTL circuit model of the circuit design.

Power intent descriptions are provided in any suitable format, e.g., Unified Power Format (UPF) and Common Power Format (CPF). Power intent descriptions include information defining power and voltage domains, supply network, power switches, isolation cells and level shifters, retention cells, power states or modes, and a power state table. Power domains define groups of blocks that can be turned off together resulting in potential loss of data in non retention cells in order to save power. The values of retention cells are saved when leaving a power-on state, and are restored during power-on-sequence, and non-retention cells do not retain their value when their power domain is power sequenced. According to an isolation cell, an isolated signal may have a different driver than stated in the RTL if an isolation condition is true. Isolation cells are macros instantiated at the inputs and/or outputs of a power-domain such that during power-on, they behave as a wire. When a power domain is not powered on, the values of isolated signal will be driven to a constant value (known as the clamp value), and the flops and other signals (including the retention cells) are not required to be driven to any specific value, but, during power on sequence, the retention cells will be restored to their previous values.

For convenience, the power intent description used in the following discussion will be UPF, though any format may be used. The UPF 120 may include description of power domains with their names, a list of retention flops for each power domain and any optional attributes, a list of isolation signals for each power domain and their optional attributes, and power switch definitions.

The RTL 110 and UPF 120 are provided to a transform module 130. Transform module 130 produces a power aware RTL' 140 that accounts for functionality described in the UPF. The following paragraphs describe examples of transformations of logic from RTL 110 to RTL' 140. In the following examples, the non-underlined code represents the RTL description that is carried over from RTL 110 to RTL' 140. Code marked with a strikethrough represents the RTL description that was in the RTL 110 but is removed when generating RTL' 140. Code that is underlined represents the code that is added when transforming RTL 110 to RTL' 140 to account for functionality described in the UPF.

In one embodiment, the transformation utilizes several power-related signals that are usually present in both the RTL and power intent description. These signals are part of the power sequences, such as "power-on" to retention sequence, and retention to "power-on" sequence; these sequences are provided by the user, and verification of low power design usually involve executing these sequences and checking if the design behaves as expected. For convenience, the following discussion will use the names "supply", "pwr_en", "clk_en", "save_en", "restore_en", and "iso_en".

supply: This signal is the supply voltage that is selected for a power domain, based on the modes set in the design. This voltage is then mapped into either logical 0 or 1, where 0 means the absence of voltage, 1 means present of voltage.

pwr_en: This signal is used to enable power to a power domain. Note that in order for a domain to be considered powered on, both pwr_en and supply have to be 1.

clk_en: This signal is used to enable the clock logic to a power domain. Note that the flops will not get new values until the clock is enabled.

save_en: This signal is used to save the output of the retention cells into the internal ram that is used for restoring their values when powering on a power domain.

restore_en: This signal is used to restore the values of retention cells from the internal ram previously populated by the "save_en" signal.

iso_en: This signal is used to enable driving the isolated signals into specific constant value (the clamp value), instead of the usual driver in the RTL during power-on.

In the RTL, there may be drivers to the power signals. The power signals generally don't drive anything, with the exception of clk_en. The signal "clk_en is usually implemented to drive other logic when other signals are not. Since the RTL drives these power signals, the power sequences may be executed or enforced by assumptions. In an embodiment, the driving logic may be disconnected and the power sequences may be relied to on to enforce values in the power related signals. In one embodiment, the power signals do not need to be included in the RTL description.

In one embodiment, non retention flops inside a power domain, e.g. the following RTL segment always @(posedge clk) begin
q<=rst? {WIDTH {1'b0}}:d;
end are transformed into the following netlist:

always @(posedge clk or negedge supply or negedge pwr_en) begin
q<=(!supply||!pwr_en)? {WIDTH{1'bX}}:
rst? {WIDTH{1'b0}}:d;
end Similarly, the same RTL segment in the RTL 110, if specified as a retention flop by the power intent description 120, is transformed into an instantiation of the module "nl_lowpower_ret_flop" as follows:

nl_lowpower_ret_flop_inst_ret_lpv__0(.d(d), .clock(clk), .async_val({WIDTH {1'b0}}, .async_cond(rst), .q(q), .pwr_enable(pwr_en), .save_enable(save_en), .restore_enable(restore_en));

In one embodiment, the implementation of "nl_lowpower_ret_flop" comprises:

module nl_lowpower_ret_flop #(parameter WIDTH=1) ( . . . );
always @(posedge clk or negedge supply or negedge pwr_en or posedge restore_en) begin
q<=(!supply||!pwr_en)? {WIDTH{1'bX}}:
restore_en ? save_q:
rst ? {WIDTH{1'b0}}:d;
end
always @(posedge save_en) begin
save_q<=(save_en) ? q:save_q;
end
endmodule Other embodiments may store data in a separate ram instead of "save q".

An isolated port is connected to an isolation cell instance by the transformation module 130. An input port net is replaced by a temp net as follows:

module test(input clk, input rst, input:tmp_lpv__0);
nl_lowpower_iso_cell:inst_iso_lpv__0 (
.in(:tmp_lpv__0), .out(in0),
.cond(iso_en), .value(clamp_value), .supply(supply));
endmodule An output net driver is replaced with a temp net by the transformation module 130:

module test(input clk, input rst, output out0);
:tmp_lpv__1<=1'b0;
nl_lowpower_iso_cell:inst_iso_lpv__1 ( .in(:tmp_lpv__1), .out(out0),
.cond(iso_en), .value(clamp_value), .supply(supply));
endmodule An output net driver is replaced with a temp net by the transformation module 130:

```
module test(input clk, input rst, output out0);
:tmp_lpv__1<=1'b0;
nl_lowpower_iso_cell:inst_iso_lpv__1 (
    .in(:tmp_lpv__1), .out(out0),
    .cond(iso_en), .value(clamp_value), .supply(supply));
endmodule
```

All of the three isolation transformations shown above use the isolation cell module defined as follows by the transformation module 130:

```
module nl_lowpower_iso_cell #(parameter WIDTH=1)
(input [WIDTH-1:0] in, //input to the isolation cell
input cond, //indicates if out is isolated
input [WIDTH-1:0] value, //isolation value
input supply, //power supply of isolation cell
output [WIDTH-1:0] out//output of isolation cell);
assign out=supply ? (cond ? value:in):{WIDTH {1'bX}};
endmodule
```

A power-mux is added at all inputs and outputs of the power domain in order to account for unknown values resulting from powered off domains:

```
module test(input pwr_en, input tmp_lpv__0, output out);
:tmp_lpv__1<=1'b0;
in=!pwr_en ? 1'bX::tmp_lpv__0;
out=!pwr_en ? 1'bX::tmp_lpv__1;
endmodule
```

An example of generated verilog code that defines each power switch is as follows:

```
module psw_my_switch (out_port, in_port0, in_port1,
    ctrl_in0, ctrl_in1, clk);
    output out_port; //output port
    input in_port0; input in_port1; //input ports
    input ctrl_in0; input ctrl_in1; //control ports
    input clk;
    reg my_out_port;
    wire ON_VDD0=!ctrl_in0; //power on states
    wire ON_VDD1=!ctrl_in1;
    wire OFF_ALL=(ctrl_in0 && ctrl_in1); //power off
      state
    always @(posedge clk) begin
      my_out_port=1'bx;
      case (1'b1)
        ON_VDD0:begin my_out_port=in_port0; end
        ON_VDD1:begin my_out_port=in_port1; end
        OFF_ALL:begin my_out_port=0; end
        ERROR_STATE:begin assert (0); end
        default:begin assert(0); end
      endcase
    end
    assign out_port=my_out_port;
endmodule
```

The above power switch code generated from the voltage specification is used to drive the "supply" signal of each power domain. Using transformations similar to, and in addition to, those described above, the transformation module 130 generates an RTL' 140 based on the RTL 110 and UPF 120.

Additional processes and analysis may be performed utilizing RTL' 140 to verify and/or enhance its functionality. Retention flop module 150 analyzes the flops of RTL' 140 to determine whether any flops listed in a retention flop list can be removed and/or whether any flop not listed in the retention flop list should be added to the retention flop list. A retention flop list identifies which flops should be implemented as retention cells which maintain their value even while the power domain including the flop is powered down. Implementing retention cells ensures proper functionality of the circuit design. Additionally, a verification module 160 performs power aware sequential equivalence checking on various RTL and power intent descriptions to verify that RTL and power intent description outputs behave the same when accounting for power states.

Retention Flop Verification

Figure 2:
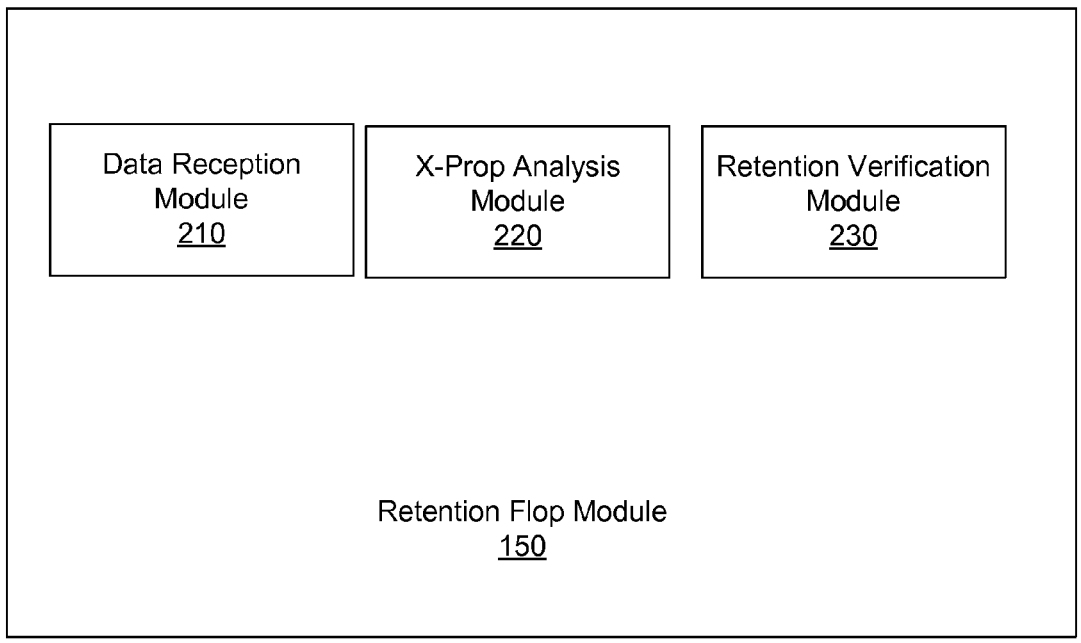
FIG. 2 illustrates a block level diagram of the retention flop module according to one embodiment.

FIG. 2 illustrates a block level diagram of the retention flop module according to one embodiment. The UPF 120 includes explicit lists of flops whose values are to be saved before power off of their respective power domain. The saved values are to be restored when power is returned to the powered off power domain. To recover the states needed for proper output, certain flops are designated as retention cells. In one embodiment, it is the goal of the retention flop module 150 to reduce the amount of retention cells used in RTL' 140 while ensuring states are properly restored after a power sequence where needed to ensure proper functionality.

The data reception module 210 receives RTL' 140 and UPF 120, the UPF 120 including a retention list identifying certain flops as retention cells. As to be discussed, a notion of X's is introduced. An X is an unknown binary value. While unknown, an X is not capable of being, e.g., a voltage representing anywhere in between logical 0 and logical 1. Rather an X is unknown but still must be a binary 1 or 0. This restriction allows us to more readily determine whether an X can propagate to another area of RTL' 140.

X-Propagation analysis module 220 verifies that specified retention flops are sufficient to regenerate states of the circuit described by RTL' 140 when the circuit is powered on. Given an unknown binary value at location A, a formal verification algorithm can be used to determine whether the unknown binary value X can reach a location B. By testing an X at the output of each non-retention flop, the x-prop analysis module determines whether the X can be propagated to other locations in the circuit. In one embodiment, all other locations are tested. In other embodiments, only locations designated as outputs or user designated locations are tested. If an X is able to propagate from location A, the output of a non-retention flop, to a designated location B, the x-prop analysis module determines that the non-retention flop should be modified to a retention flop. By modifying the non-retention flop into a retention flop, the value at the flop is saved before power is turned off and restored when power is turned on. This restoration of the value prevents an unknown binary value X from occurring. Therefore, the only value that propagates is the accurate value that has been saved and restored. In one embodiment, conversion from a non-retention flop to a retention flop is performed automatically responsive to determining that an X is able to propagate from a non-retention flop, while in another embodiment the option is provided to a user.

According to one embodiment, the algorithm to determine whether an X can propagate from location A to location B may create two copies of the circuit model, L and R, where L is the master copy and R is an X-injected copy of the design. The net n of the two copies has an unknown binary value at location A if the value of the net in L is different from the value of the same net in R. This is denoted as L.n !=R.n.

The steps of such an algorithm may include first extracting the set of nets S1 as the intersection of the nets in the transitive fanout of the net A in L and the nets in the transitive fanin of the net B in L. The nets in L that do not belong to S1 are then designated as S2 and the net A in L is removed from S1. S1 and S2 contain only nets in L and are created based on A and B at this point.

For each net n in S2, the x-prop analysis module 220 assumes the corresponding net n in R always has the same value as the net n in L, i.e., R.n=L.n. For each net n in S1, the x-prop analysis module 220 duplicates circuit logic for the net n in R as a function of R. For every bit in the bus A, the x-prop analysis module 220 configures the analysis to assume lhs (R.a)=(R.e)?a':rhs(R.a), where a' is a new free input added to the circuit model. The notation lhs(A) and rhs(A) indicates that, given a net A in the circuit model, the net A can be split into two nets, i.e., lhs(left-hand-side)(A) and rhs(right-hand-side) (A) connected through a buffer. The symbol "R.e" captures "e" as the expression representing the condition in which an X can be injected. In one embodiment of the invention, this expression is set to true when the "restore_en" signal is asserted to have value 1. The new free input a' is used to introduce the possibility to tag the data as an unknown binary value, allowing the formal verification algorithm to pick a value different than the one used for net a in L.

Formal verification is run using a traditional algorithm, e.g., model checking, to determine if L.B !=R.B is possible. If it is not possible, the unknown binary value from the location A cannot be propagated to location B. If it is possible, the algorithm can generate a trace showing how the unknown binary value can be propagated to B. The trace may be based on how the circuit model L is exercised, with the unknown binary value marked accordingly when the data in circuit model R has a different value. Note that, by assuming R.n=L.n, many nets in the copy R are not relevant to the analysis and can be optimized away, so only part of the circuit model is duplicated in R.

The retention verification module 230 verifies that a flop designated as a retention flop should remain a retention flop. For a certain flop A, without retention functionality, an X may appear at the output of the flop after power is restored. The UPF may then designate the flop to have retention capabilities to prevent the X from appearing and to ensure accurate functionality. However, if the input to the flop A stems from the output of flop B and flop C, both flop B and C having retention, it may be possible to avoid designating flop A as a retention flop while still ensuring accurate functionality. To accomplish this, a power on delay may be implemented for flop A during a power sequence. This allows flops B and C to be on for a period of time sufficiently long for their retained values to propagate to the input of flop A. By implementing a power on delay for flop A, we can ensure that the output of flop A is a known value based on retention flops B and C rather than an X value.

To accomplish this verification of whether a retention flop should remain a retention flop, according to one embodiment, the retention verification module 230 accesses the list of retention flops L1 with the flops r1, r2, r3, etc. designated for retention. The retention verification module 230 instantiates a reference model ram, ref_ram. One flop, e.g., r1, is removed from list L1 to generate list L2. The retention verification module 230 performs a "power-on to retention" sequence on a circuit. The power-on to retention sequence saves all the values of flops so that they may be restored. The values of all retention flops are saved to the reference model ram, including those only designated as retention flops in list L1. After savings the values, power to one or more power domains of the circuit is turned off. A "retention to power-on" sequence re-enables power to the circuit and analyzes, after a delay n, whether the current values of the flops are the same as the values stored in the ref_ram. Delay n is defined as the duration in clock-cycle between restore_en and the disable of isolations. To accomplish this, the saved flop values are restored to the flops designated as retention flops in list L2. Before comparison, a delay n passes allowing values from restored retention flops to propagate to non-retention flops. If the current values are the same as the saved values for all flops, including those removed from list L1 to generate list L2, the set of flops removed from list L1 to generate list L2 can be safely designated non-retention rather than retention, and still provide accurate functionality after a delayed start-up period of time n, latency n or n clock cycles. By allowing for the delay n to pass before providing accurate functionality, retention cells in a circuit model can be converted to non-retention cells allowing a simpler and more efficient design. Thus, a tradeoff is made of initial inaccuracy for design optimizations.

The process may be repeated altering the value of delay n and which flops are included in the set of flops removed from list L1 to generate list L2 to determine a variety of options that may be selected from by the retention verification module 230 or provided to a user for selection. Typically, a longer delayed start-up period n will allow for more flops to be removed from the retention list without hindering accurate functionality.

Power Aware Verification

Figure 3:
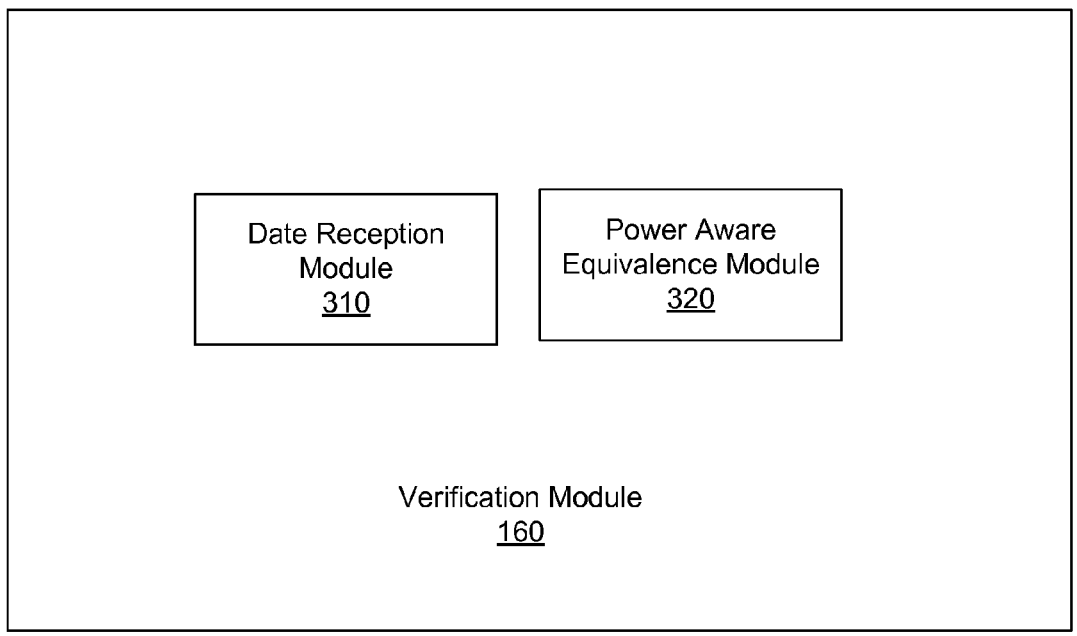
FIG. 3 illustrates a block level diagram of the verification module according to one embodiment.

FIG. 3 illustrates a block level diagram of the verification module according to one embodiment. Verification module 160 is configured to perform power aware formal sequential equivalence checking. In contrast to traditional sequential equivalence checking, power aware sequential equivalence checking verifies that two transformed RTL descriptions are functionally equivalent while considering that outputs need to be valid and equivalent only while the nets providing the outputs are powered on. In other words, power aware sequential equivalence checking verifies that the outputs of two transformed RTL descriptions have the same behavior, but only when the power domain driving the outputs is powered on. Power sequential equivalence checking excludes and does not care about the behavior of the outputs when the power domain driving the outputs is powered off. The outputs are ignored during the power off state because they are not valid during the power off state.

Data reception module 310 receives two RTL descriptions, RTL and an optimized RTL ("RTL_opt"), and two UPF descriptions, UPF and optimized UPF ("UPF_opt"). In one embodiment, RTL_opt is an altered version of RTL and UPF_opt is an altered version of UPF. The alterations in RTL_opt and UPF_opt may include alterations that optimize the function of the circuit to conserve power. For example, certain flops may be converted from a retention flop to a non-retention flop by the retention flop module 150 for efficiency purposes. In another embodiment, RTL and RTL_opt are identical, while UPF and UPF_opt differ. In yet another embodiment, UPF and UPF_opt are identical, while RTL and RTL_opt differ.

Power aware sequential equivalence module 320 combines the received RTL and UPF to generate RTL' and combines RTL_opt and UPF_opt to generate RTL'_opt. The power aware sequential equivalence module 320 performs power aware sequential equivalence checking on RTL' and RTL'_opt to verify that designated outputs have the same value while the net including the output is powered on. The UPF and UPF_opt power intent descriptions describe which nets are powered on at which times. In one embodiment, a user designates certain outputs for which equivalence is verified.

In one embodiment, RTL_opt is not an altered version of RTL. Instead, RTL_opt is identical to RTL. UPF and UPF_opt are still different. As a result, the same description of the circuit design is effectively used in both generating RTL' using UPF and generating RTL'_opt using UPF_opt.

In one embodiment, UPF_opt is not an altered version of UPF. Instead, UPF_opt is identical to UPF. RTL and RTL_opt are still different. As a result, the same power description is effectively used in both generating RTL' from RTL and generating RTL'_opt from RTL_opt.

Power Sequences

Power aware verification requires the saving and restoring of values in retention cells in order to test the accuracy of outputs while considering the power provided to power domains. To accomplish this, in one embodiment, the retention flop module 150 or the verification module 160 receives power sequences from a user including a "power-on to retention" sequence as described in a power architecture. In one embodiment, the power-on to retention sequence is described in SystemVerilog Assertion syntax as:

save_en ##[1:$]!save_en && !clk_en ##[1:$]!save_en && iso_en && !clk_en
    ##[1:$]!save_en && iso_en && !clk_en && !pwr_en [repeat until next sequence is initiated]

In the above example, when save_en is asserted, RTL' saves the flop values in the retention flops into the retention ram, when clk_en is asserted, the clock logic for the power domain is enabled, when iso_en is asserted, the isolation signals are clamped to the specified values, and when pwr_en is asserted, power is on for the power domain. The final expression "!save_en && iso_en && !clk_en && !pwr_en" is held true until another sequence such as "retention to power-on" is initiated.

In an example embodiment, a "retention to power-on" sequence may be described in power architecture as:

pwr_en ##1 pwr_en && restore_en ##1 pwr_en && !restore_en ##1 pwr_en && !restore_en && clk_en
    ##[1:n] pwr_en && !restore_en && clk_en && !iso_en [repeat until . . . ]

In this code, when restore_en is asserted, RTL' restores the flop values saved into the retention ram, when clk_en is asserted, the clock logic is enabled for the power domain, when iso_en is asserted, the isolation signals are clamped to specified values, and when pwr_en is asserted, power is on for the power domain. The expression "pwr_en && !restore_en && clk_en && !iso_en" is then held true until another power sequence is initiated.

As previously discussed when performing x-prop analysis, the value "n" can be adjusted depending on how aggressive the power intent description is to be optimized. A larger n generally results in fewer flops needing to be designated as retention flops in the retention flop list to ensure accurate functionality.

These power sequences are considered part of the power intent description; while they may or may not be expressed in the UPF or CPF format, they are considered part of the inputs to the various modules in embodiments of this invention.

Example Flow Charts

Figure 4:
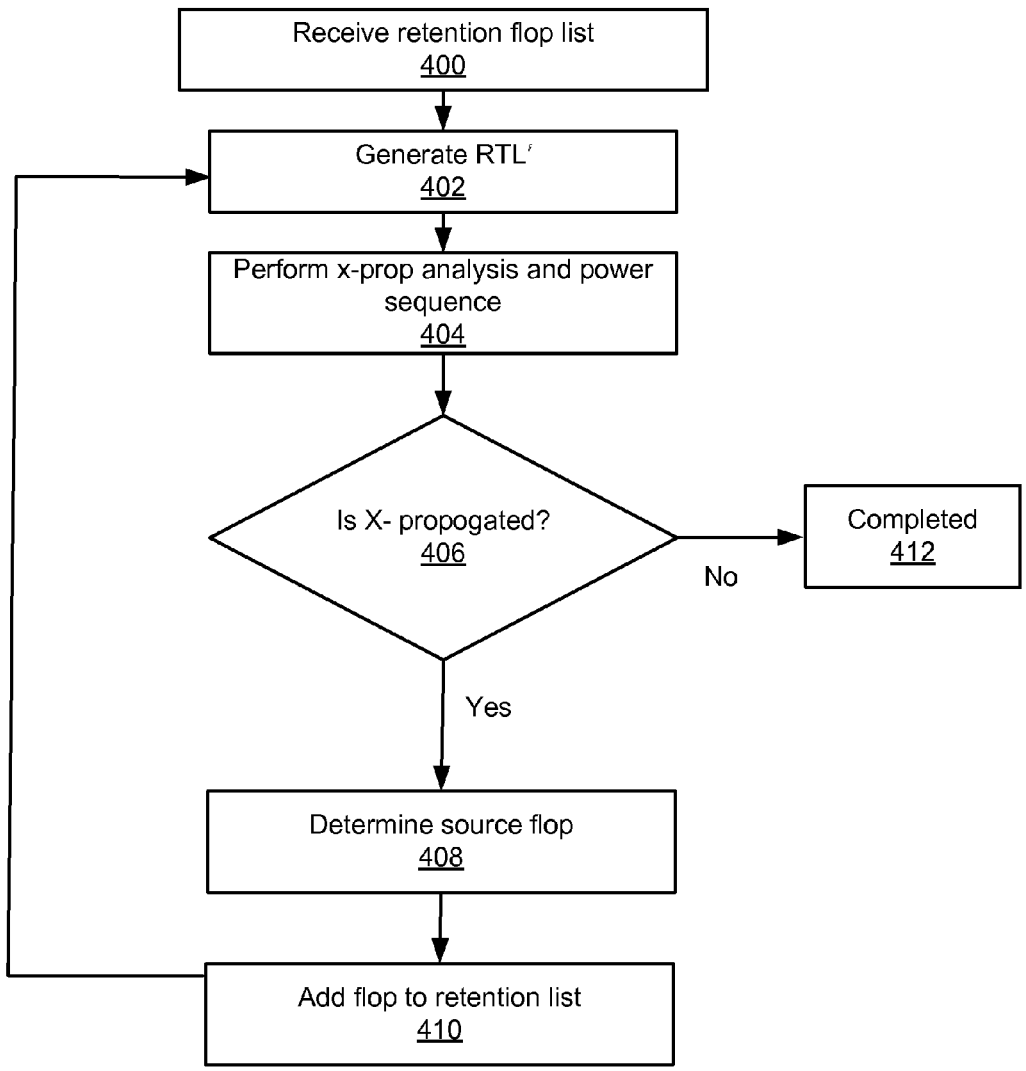
FIG. 4 illustrates a flow chart for performing x-propagation analysis by the transform module and retention flop module according to one embodiment.

FIG. 4 illustrates a flow chart for performing x-propagation analysis by the transformation module 130 and/or retention flop module 150 according to one embodiment. A retention flop list is received 400 identifying the flops in the RTL that are designated to be implemented as retention flops that retain their value after a power sequence. An RTL' is generated 402 accounting for the retention flop list. X-propagation analysis is performed 404 to determine whether any unknown binary values, or Xs, can propagate from a non-retention flop. In this analysis, conditional x-prop is performed where the condition is true after the power-on to retention sequence, followed by the retention to power-on sequence, while system power remains on. If an X is 406 propagated, the x-prop analysis module 220 determines 408 the source flop that causes the X to propagate.

In one embodiment, the x-prop analysis is performed sequentially on each non-retention flop obviating the need to find the source of the flop. In another embodiment, x-prop analysis is performed in parallel for a plurality of non-retention flops to enhance the performance of x-prop analysis. After identifying the source of a propagated X, the source flop(s) are added 410 to the retention flop list, and the process is repeated from step 402 to ensure that no other Xs are propagated in the circuit, with subsequent iterations accounting for flops that are newly designated as retention flops. In one embodiment, the generated RTL' also accounts for power on delays and calculated by the retention verification module 230 as well as other parameters set by the UPF.

Figure 5:
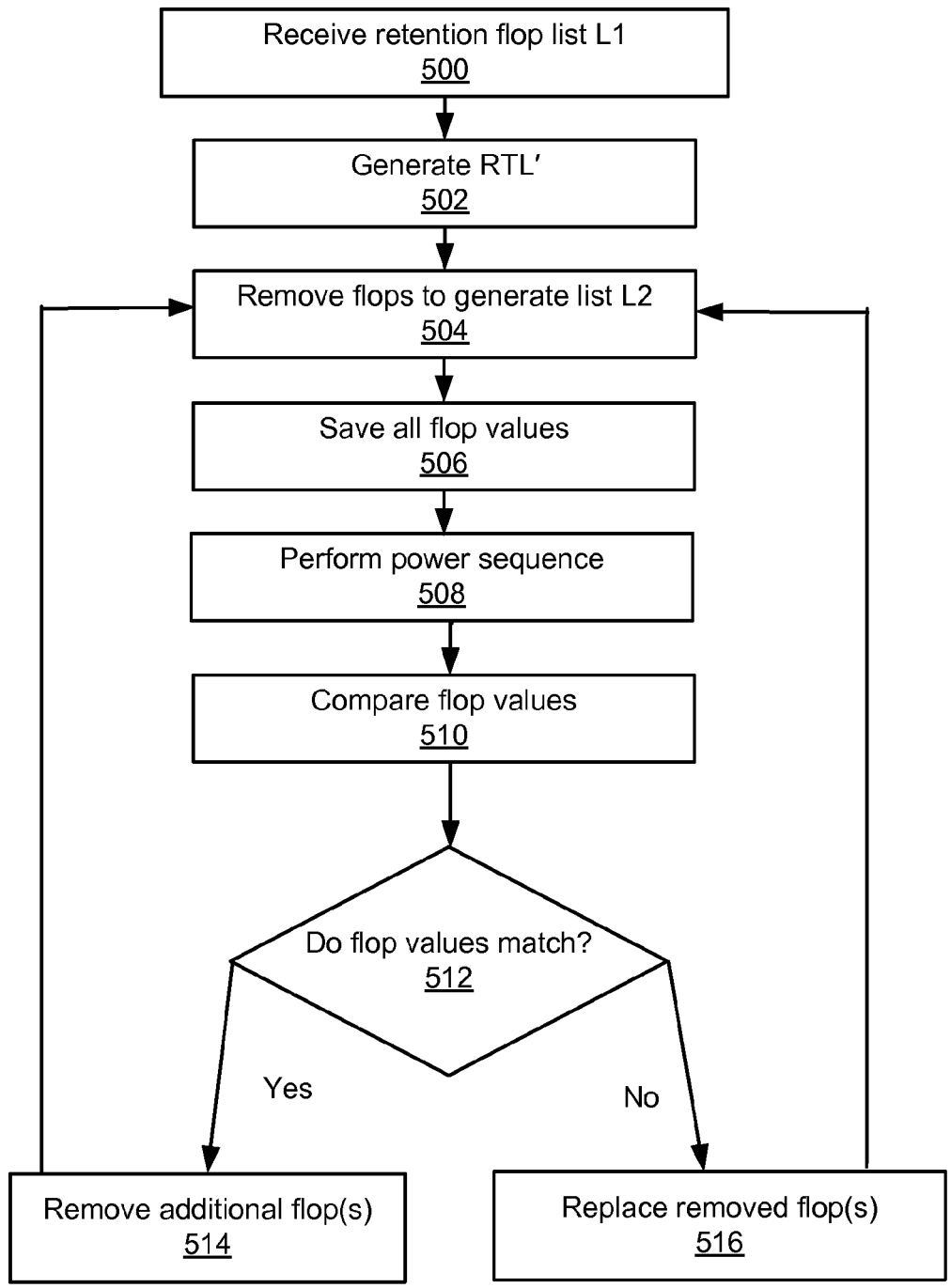
FIG. 5 illustrates a flow chart for performing retention verification analysis according to one embodiment.

FIG. 5 illustrates a flow chart for performing retention verification analysis according to one embodiment. A retention flop list L1 is received 500 identifying the flops in the RTL that are designated to be implemented as retention flops that retain their value after a power cycle. An RTL' is generated 502 accounting for the retention flop list L1. The generated RTL' also accounts for power on delays and calculated by previous iterations of the process described in FIG. 5 as well as other parameters set by the UPF. A set of flops is removed 504 from list L1 to generate list L2. In one embodiment, the set of flops removed is initially a single designated flop. A power-on to retention sequence is performed saving 506 the values of all flops in list L1, not just those designated by L2, to a reference ram, which reserves as the checker. In one embodiment, the set of values that is saved to the reference ram for later comparison is designated by the user. A retention to power-on sequence is performed in 508 where the power provided to the nets in the design varies according to the power on delay n. Further, the power-on sequence restores the values of the flops in list L1 both from retention flops and from propagation of constants. In one embodiment, the value of n is set to an initial default value or a value designated by a user.

The current values of flops in list L1 after the power cycle are compared 510 to the flop values saved in the reference ram. If the flop values match 512, it is determined that the system does not contain any unknown binary values X at any of the saved values after allowing for the delay n. In this case, additional flop(s) are removed 514 from list L2 in an attempt to further simplify the design by removing additional retention flops. If the flop values do not match 512, the flop that was removed from list L2 in the current iteration may be replaced 516 and tested from step 504. If all flops have been tested or an iteration limit has been reached, the process may cease to repeat for the current delay value n being tested. In one embodiment, the flops that may be converted to non-retention flops at the current delay value n are presented to the user with the option to implement the identified changes.

In an embodiment, the flow illustrated in FIG. 5 is repeated for an automatically incremented delay value n, or another delay value n designated by the user. An increased delay value n typically results in a greater number of retention flops being convertible to non-retention flops in order to reduce circuit complexity.

In another embodiment of the invention, a temporal property "seq1#·[1:$] seq2(n)|→values(flops)==values (ref_ram)" may be passed to a formal verification algorithm to determine if any of the retention flops can be removed from the list. In this expression, seq1 is the "power-on to retention" sequence, seq2 is the "retention to power-on" sequence, values(flops) are the values of the flops, values(ref_ram) are the values saved in the reference model ram.

Figure 6:
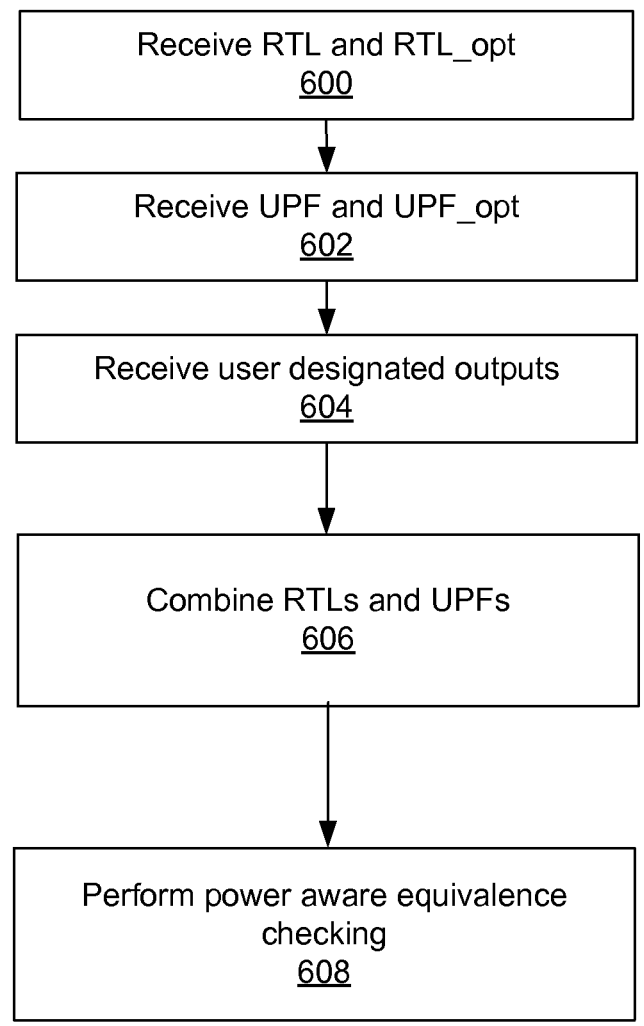
FIG. 6 illustrates a flow chart for performing power aware verification according to one embodiment.

FIG. 6 illustrates a flow chart for performing power aware verification according to one embodiment. An RTL and RTL_opt are received 600 and a UPF and UPF_opt are received 602. In one embodiment, RTL_opt is an optimized version of RTL and UPF_opt is an optimized version of UPF, where the optimizations have been made to reduce the complexity or power usage of a circuit. For example, the designation of retention and non-retention flops, along with an appropriate power delay n as determined by the retention flop module 150 may be reflected in RTL_opt and/or UPF_opt. In certain embodiments, the RTL and RTL_opt received may be identical while the UPF and UPF_opt differ. Similarly, in certain embodiments the UPF and UPF_opt received may be identical while the RTL and RTL_opt differ. User designated outputs are received 604 which indicate the values that are to be tested in sequential equivalence checking RTL and UPF are combined 606 to generate RTL' while RTL_opt and UPF_opt are combined to generated RTL'_opt Power aware sequential equivalence checking is performed 608 on RTL' and RTL'_opt to verify that they exhibit the same behavior at the designated outputs when the appropriate net is powered on according to the power intent descriptions. Traditional sequential equivalence checking verifies that the outputs match at all times, which may cause designs with valid optimizations to fail sequential equivalence checking By accounting for when certain nets in a design are powered on, flops or output values need only be valid at certain times of operation. This enables a designer to introduce greater optimizations while the design continues to be functionally equivalent for the intended purpose.

SUMMARY

The foregoing description of the disclosed embodiments has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the disclosed embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

The disclosed embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the disclosure, which is set forth in the following claims.

What is claimed is:

1. A computer implemented method for retention flop list analysis, the method comprising:
   receiving a first register transfer level (RTL) circuit model of a circuit design, the first RTL circuit model including a plurality of flops;
   receiving a power intent description of the circuit design, the power intent description including a retention flop list for a power domain;
   analyzing the first RTL circuit model and the power intent description to identify a retention flop of the plurality of flops for modification; and
   enhancing functionality of the plurality of flops by verifying the plurality of flops and performing a propagation analysis using a retention flop analysis mechanism that is coupled with at least one processor of a computing system and determines whether a conversion between the retention flop and a non-retention flop is to be performed based in part or in whole upon state information in the power domain and further by performing the conversion that has been determined to be performed while reducing a number of nets to be analyzed by the retention flop analysis mechanism coupled with the at least one processor in the analysis.

2. The method of claim 1, wherein the method further comprising modifying the retention flop list by removing the retention flop from the retention flop list based at least in part upon results of analyzing the first RTL circuit model to restore the power domain to an accurate state, and one or more non-retention flops of the plurality of flops are identified for modification to retention flops.

3. The method of claim 2, wherein the one or more non-retention flops are identified through unknown binary number propagation analysis, and the retention flop removed from the retention flop list is replaced with a non-retention flop of the one or more retention flops.

4. The method of claim 3, wherein the unknown binary number propagation analysis is performed in parallel on a plurality of non-retention flops.

5. The method of claim 2, wherein modifying the retention flop list comprises adding one or more non-retention flops to the retention flop list.

6. The method of claim 2, wherein one or more retention flops in the retention flop list are identified for modification to non-retention flops.

7. The method of claim 6, wherein modifying the retention flop list comprises removing at least one flop from the retention flop list.

8. The method of claim 6, wherein an accurate state comprises values of the plurality of flops being same before and after a power-sequence is performed.

9. The method of claim 8, further comprising:
verifying the accurate state of the plurality of flops after a power-on delay has occurred for a first time period.

10. The method of claim 9, wherein the retention flop is identified by verifying the accurate state of the plurality of flops utilizing the retention list after the retention flop has been removed from the retention list.

11. The method of claim 9, further comprising:
increasing the duration of the first time period responsive to receiving an input from a user indicating the accurate state of the first plurality of flops should be verified after a longer power-on delay.

12. A non-transitory computer-readable storage medium comprising computer program code for retention flop list analysis, the program code comprising a sequence of instructions which, when executed by at least one processor, causes the at least one processor to perform a group of acts for retention flop list analysis, the group of acts including:
receiving a first register transfer level (RTL) circuit model of a circuit design, the first RTL circuit model including a plurality of flops;
receiving a power intent description of the circuit design, the power description including a retention flop list for a power domain;
analyzing the second RTL circuit model to identify a retention flop of the plurality of flops for modification; and
enhancing functionality of the plurality of flops by verifying the plurality of flops and performing a propagation analysis using a retention flop analysis mechanism that is coupled with at least one processor of a computing system and determines whether a conversion between the retention flop and a non-retention flop is to be performed based in part or in whole upon state information in the power domain and further by performing the conversion that has been determined to be performed while reducing a number of nets to be analyzed by the retention flop analysis mechanism coupled with the at least one processor in the analysis.

13. The computer-readable storage medium of claim 12, wherein one or more non-retention flops of the plurality of flops are identified for modification to retention flops, and the group of acts further includes modifying the retention flop list by removing retention flop from the retention flop list based at least in part upon results of analyzing the first RTL circuit model to restore the power domain to an accurate state.

14. The computer-readable storage medium of claim 13, wherein the one or more non-retention flops are identified through unknown binary number propagation analysis, and the retention flop removed from the retention flop list is replaced with a non-retention flop of the one or more retention flops.

15. The computer-readable storage medium of claim 14, wherein the unknown binary number propagation analysis is performed in parallel on a plurality of non-retention flops.

16. The computer-readable storage medium of claim 13, wherein modifying the retention flop list comprises adding one or more non-retention flops to the retention flop list.

17. The computer-readable storage medium of claim 12, wherein one or more retention flops in the retention flop list are identified for modification to non-retention flops.

18. The computer-readable storage medium of claim 17, wherein modifying the retention flop list comprises removing one or more of the plurality of flops from the retention flop list.

19. The computer-readable storage medium of claim 17, wherein the accurate state comprises values of the plurality of flops being same before and after a power-sequence is performed.

20. The computer-readable storage medium of claim 19, the group of acts further comprising:
verifying the accurate state of the plurality of flops after a power-on delay has occurred for a first time period.

21. The computer-readable storage medium of claim 20, wherein the retention flop is identified by verifying the accurate state of the plurality of flops utilizing the retention list after the retention flop has been removed from the retention list.

22. The computer-readable storage medium of claim 20, further comprising:
increasing the duration of the first time period responsive to receiving an input from a user indicating the accurate state of the first plurality of flops should be verified after a longer power-on delay.

* * * * *